Feb. 28, 1928.

G. JOHNSON

BUMPER

Filed Nov. 26, 1926

1,660,618

Patented Feb. 28, 1928.

1,660,618

UNITED STATES PATENT OFFICE.

GOTTFRED JOHNSON, OF SEATTLE, WASHINGTON.

BUMPER.

Application filed November 26, 1926. Serial No. 150,818.

This invention relates to improvements in vehicle bumpers and more particularly to a bumper for use on automobiles that comprises a frame-like portion that may be manually moved from vertical to horizontal position and vice versa to provide a luggage carrier when desired.

With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts in both views.

The bumper comprises a body or frame portion that may be disposed in vertical position when used as a bumper only and that may be moved manually into horizontal position when used as a combination bumper and luggage carrier, the change in position being accomplished instantaneously and without the use of pliers, wrenches or other tools of any kind. While the present form of the bumper is intended for use on Ford cars it may with slight obvious alterations be applied to automobiles of other types. The bumper may be used as a front or rear bumper with the exception that when intended solely as a rear bumper the cross frame portion is designed to be folded.

The bumper comprises a pair of substantially parallel brackets 1, 2, the inner ends of which are adapted to be attached to the body of a Ford or to the rear frame members of automobiles of other types, said brackets being connected by the cross bar 3 that may carry a standard 4 to display the license plate 5.

Figure 1:
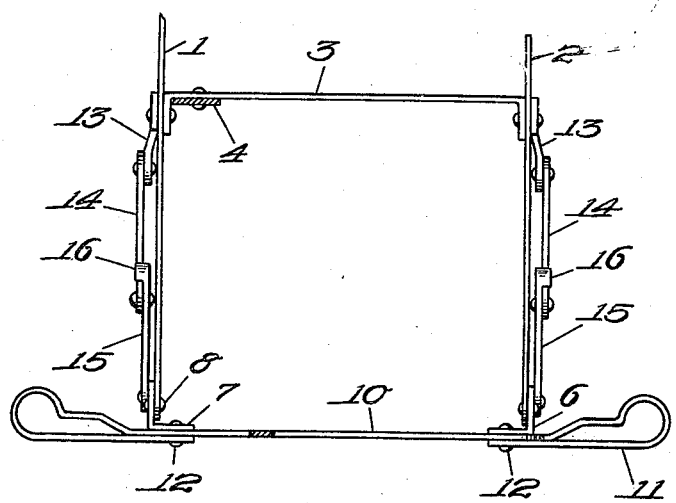
Fig. 1 is a top plan view of the bumper shown applied to the chassis of an automobile, the top cross rail being sectioned.

The brackets 1, 2 extend well beyond the front or rear of the vehicle and to their ends the twin parallel angle plates 6, 7 are secured by pivot bolts 8, each angle plate being formed with a perforation 9 and having bolted or riveted thereto the cross frame comprising a relatively short cross bar 10 and the long spaced cross bars 11, the outer ends of which extend well beyond the said ends of the angle plates and are bent or looped outwardly angle plates and are bent or looped outwardly, as clearly shown in Fig. 1, the bar wardly, as clearly shown in Fig. 1, the bar terminations being secured by rivets 12 to the bar body and to the angle plates, this specific construction giving greater strength and rigidity to the bars while economizing in the use of material. The total elimination of nuts or bolts to work loose is another feature.

Depending from the brackets 1, 2 at an angle thereto are lugs 13 to which the hinged overlapping links 14, 15 are pivoted that are pivoted also to the angle plates 6, 7, the link 15 being formed with an offset hooked termination 16 adapted, as the links are disposed in extended position, for engagement with the link 14.

Figure 2:
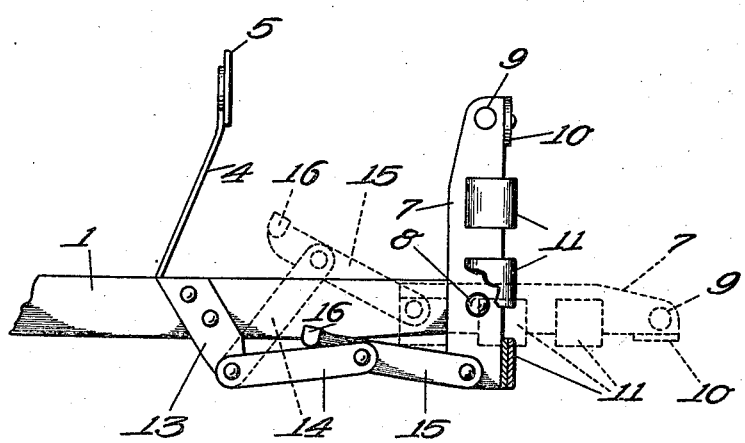
Fig. 2 is a view of Fig. 1, partly in section, in side elevation, the dotted lines denoting an altered position of the relatively movable parts.

As the links 14, 15 are manually moved to the position shown in dotted lines in Fig. 2 the cross frame is thereby folded flat against and partly beneath the extended ends of the brackets 1, 2 against which members said frame is then braced and a trunk or luggage of any kind may be placed thereupon and strapped thereto, the straps or ropes being passed through the perforations 9 in the angle plates and then around the luggage. As the links 14, 15 are moved into full line or extended position the cross frame is thereby disposed at right angles to the brackets 1, 2 as a bumper frame. It is securely braced in this position when the links are so disposed that the offset portion 16 of link 15 is moved into engagement with the link 14, this position is approximated in the full line view in Fig. 2.

What is claimed is:—

1. In a bumper, supporting brackets, a cross frame pivotally carried at one end of said brackets, lugs depending from said brackets, and hinged links adjustably connecting said cross frame to said lugs.

2. In a bumper, supporting brackets, a cross frame pivotally carried at one end of said brackets, lugs depending from said brackets, and hinged overlapping links adjustably connecting said cross frame to said lugs, one of said links being formed with an offset hooked termination for engagement with the other link in the extended position of said members.

3. In a bumper, supporting brackets, parallel perforate angle plates pivotally carried at the ends of said angle plates, adjustable connection between said angle plates and brackets, and a cross frame comprising a plurality of cross bars secured to said angle plates, the outer ends of said cross bars being bent outwardly to form loops.

In testimony that I claim the foregoing as my own I have hereto affixed my signature.

GOTTFRED JOHNSON.